United States Patent [19]

Buxton

[11] Patent Number: 4,899,253

[45] Date of Patent: Feb. 6, 1990

[54] MOLDED CASE CIRCUIT BREAKER HOUSING REINFORCEMENT

[75] Inventor: Clifford A. Buxton, Lawrenceville, Ga.

[73] Assignee: Siemens Energy & Automation, Inc., Alpharetta, Ga.

[21] Appl. No.: 246,470

[22] Filed: Sep. 19, 1988

[51] Int. Cl.$^4$ .......... H02B 1/04

[52] U.S. Cl. .......... 361/376; 200/303; 361/353; 361/363; 361/380

[58] Field of Search .......... 200/303, 307; 335/8–10, 16; 361/353, 363, 380, 376

[56] References Cited

U.S. PATENT DOCUMENTS

| | | | |
|---|---|---|---|
| 3,329,793 | 1/1966 | Camp | 200/303 |
| 3,422,235 | 1/1969 | Camp | 200/147 |
| 4,389,555 | 6/1983 | Guinan | 200/303 |
| 4,524,339 | 6/1985 | Chabot | 335/22 |
| 4,598,186 | 7/1986 | Cook et al. | 200/144 |

*Primary Examiner*—Greg Thompson
*Attorney, Agent, or Firm*—James G. Morrow

[57] ABSTRACT

A member for reinforcing the junction between the molded half portions of the housing for a molded case circuit breaker. The member is interposed between the portions and extends along the sidewalls of the portions and rest in a channel in each portion adapted to accept the member. The member serves to strengthen the juction between the housing portions.

6 Claims, 3 Drawing Sheets

MOLDED CASE CIRCUIT BREAKER HOUSING REINFORCEMENT

BACKGROUND OF INVENTION

This invention relates to the molded case housing for a circuit breaker, and more particularly, to a means for inhibiting rupturing of the molded case housing caused by high pressures and stresses which can occur within the housing during circuit interruption.

During circuit interruption, the housing of a circuit breaker can be subjected to extremely high forces caused by high gas pressures within the housing. Many circuit breaker housings are composed of two molded portions joined to form the housing. To fasten the portions together, the housing configurations use a combination of flanges and fasteners to connect the molded portions at their interface. Normally, the portions of the housing which are likely to fail when subjected to high forces are the portions of the housing located at the interface between the two molded portions of the housing.

Therefore, it would be advantageous to provide a means for reinforcing the housing at the interface such that the junction between the molded portions maintains its integrity when subjected to the forces which occur during circuit interruption.

SUMMARY OF THE INVENTION

An object of the present invention is to provide a means for reinforcing a molded case circuit breaker housing at the junction between the molded portions of the housings.

Accordingly, there is provided an improved molded housing for a circuit breaker. The housing includes a housing reinforcing means, a first portion and a second portion. The portions each have a surface at which the portions are joined and a first channel adapted to accept the housing reinforcing means. The housing reinforcing means is adapted to rest within the channels.

An advantage of the present invention is that it provides a relatively inexpensive means for increasing the strength of a molded case housing for a circuit breaker without requiring a substantial increase in the wall thickness of the housing.

Various other objects and advantages of the present invention will become apparent from the following description, with reference to the accompanying drawing.

DETAILED DESCRIPTION OF THE PREFERRED EMBODIMENT

Figure 1:
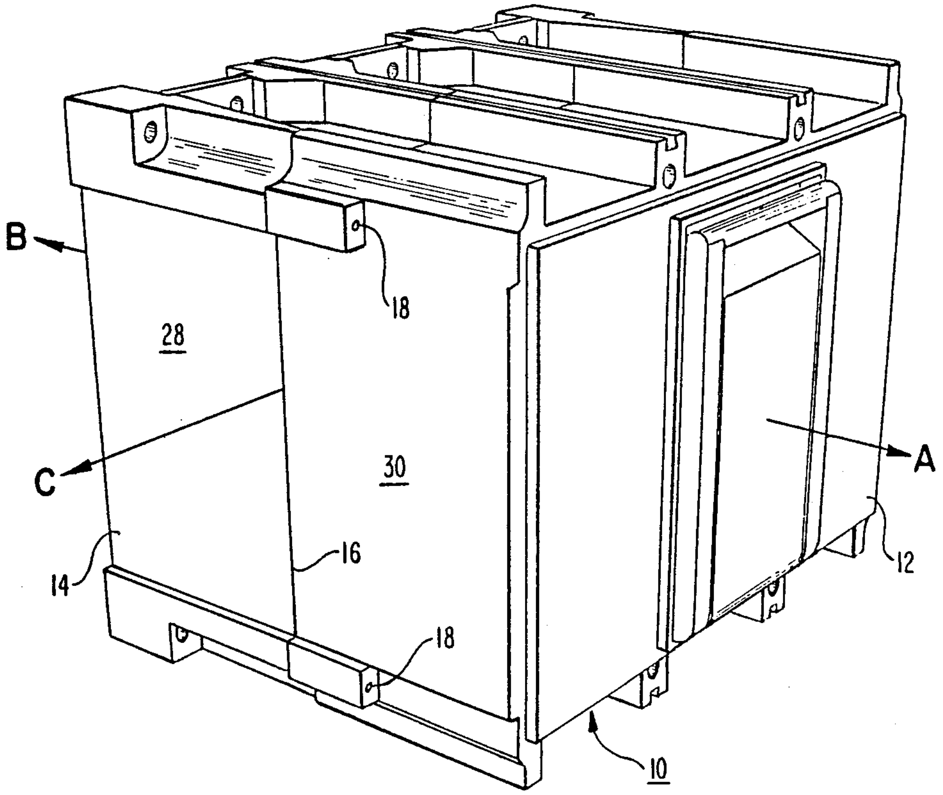
FIG. 1 is a pespective view of a molded case housing.

Referring now to FIG. 1, FIG. 1 illustrates a molded housing 10 for a circuit breaker including two case portions 12, 14. When the case portions 12, 14 are joined together a seam 16 is formed at the junction between the portions 12, 14. To restrain the portions 12, 14 from movng apart in the directions A and B, fasteners such as bolts can placed into openings 18 in the portion 12 such that the threaded portions of the bolts extend into associated threaded openings in the portion 14. (Similar openings and threaded portions are used on the side of the molded housing opposite to the side illustrating the seam 16.)

In addition to restraining the portions 12, 14 from moving apart in the directions A and B, it is also important to prevent the housing 10 from rupturing outward at the seam 16 in the general direction C. In the preferred embodiment of the invention, a reinforcing member 20 having a substantially dovetail shaped cross-section is interposed between the portions 12, 14 at the seam 16 to reinforce the seam 16.

Figure 2:
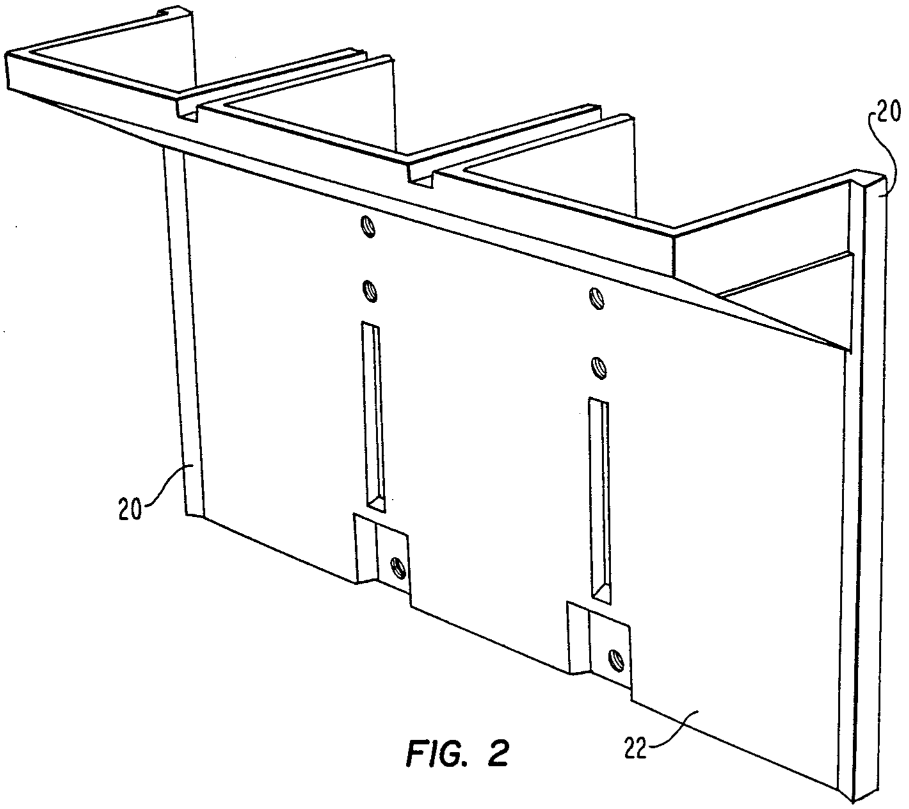
FIG. 2 is a perspective view of a housing barrier including two reinforcing members.

FIG. 2 illustrates reinforcing members 20 located at the sides of a barrier 22. The barrier 22 serves to separate the contact moving mechanism (not shown) of the circuit breaker and the contacts (not shown) of the circuit breaker. Combining the members 20 and the barrier 22 serves to provide a single unit which can be efficiently included within a circuit breaker during manufacturing. Even though this is a useful combination, it should be understood that the members could be used independent of the barrier 22.

Figure 3:
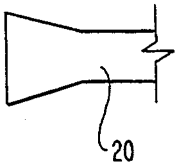
FIG. 3 is an end view of a reinforcing member.
Figure 4:
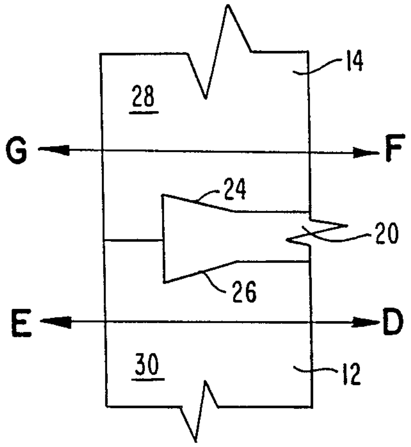
FIG. 4 is a side view of a reinforcing member located within the reinforcing member channels of the portions of a housing.

FIGS. 3 more clearly illustrates the cross-sectional shape of the dovetail shaped member 20, while FIG. 4 illustrates the cooperation of the member 20 and the portions 12, 14. The member 20 is located within the channels 24, 26 of the portions 12, 14. This cooperation prevents the portion 12 from moving in the direction D-E relative to the member 20 and the portion 14. This cooperation also prevents the portion 14 from moving in the direction F-G relative to the member 20 and the portion 12.

Figure 5:
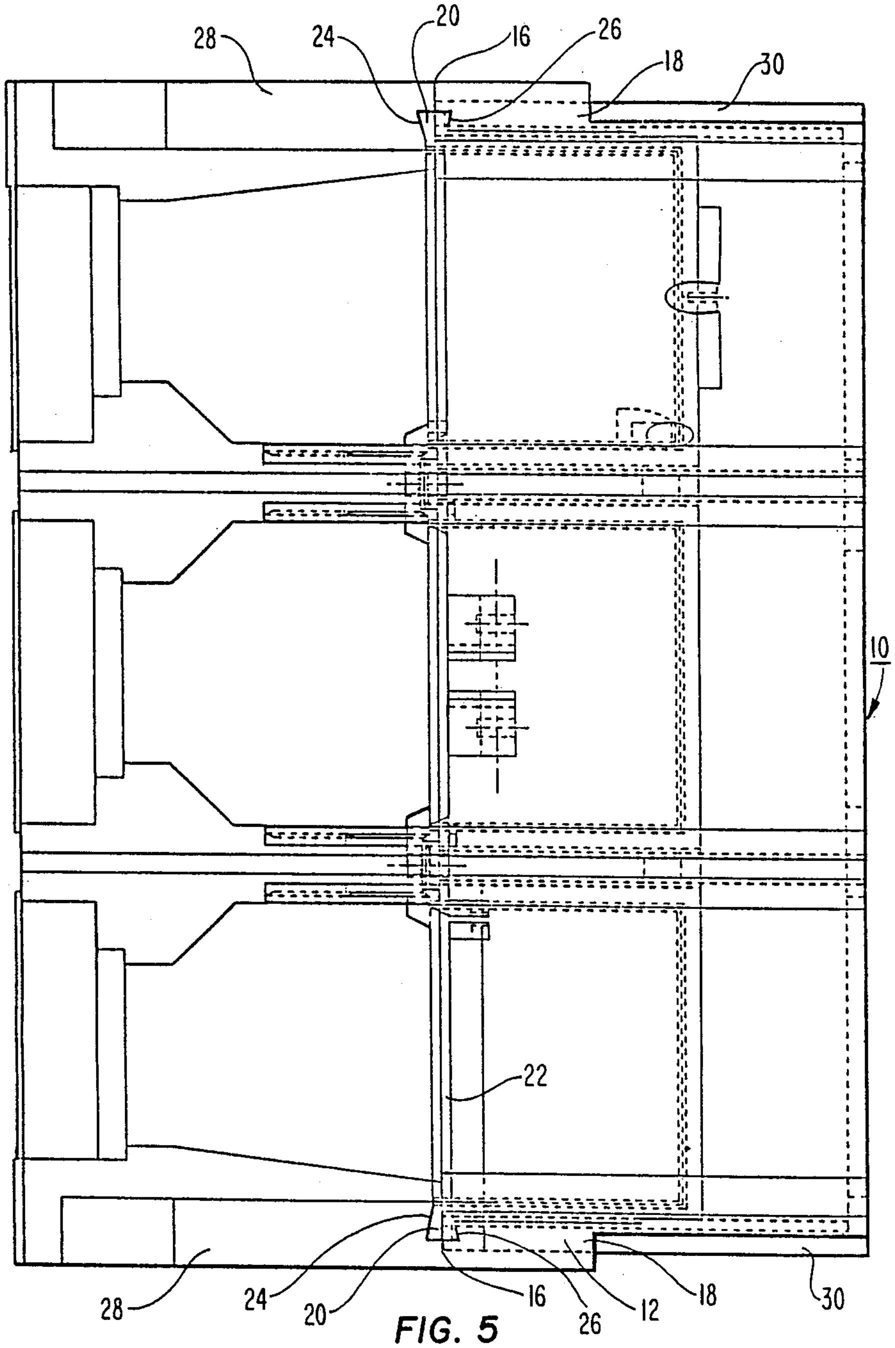
FIG. 5 is a top view of two portions of the molded case housing illustrating the reinforcing members interposed between the portions at their interface.

FIG. 5 is top cut away view of the housing 10 illustrated in FIG. 1 and illustrates the relationship of the member 20, barrier 22 and portions 12, 14. The member 20 runs along the seam 16 and, in addition to preventing relative movement of the portions 12, 14, adds strength to the side walls 28, 30. The member 20 acts like a beam and prevents the side walls 28, 30 from moving outward when the side walls are subjected to gas pressures from within the circuit breaker.

In the preferred embodiment, the members 20 are combined with the barrier 22. Thus, when the side walls 28, 30 are forced outward, the barrier 22 is put in tension and prevents the sidewalls from moving in the direction C. The dovetail cross-sectional shape of the members 20 serves to keep the members 20 from being pulled from between the portions 12, 14 when the barrier is put in tension.

While one embodiment of a reinforcing member has been shown and described in detail herein, various other changes and modifications may be made without departing from the scope of the present invention. For example, the cross-section of the member 20 could be square, circular or some other suitable shape.

I claim:

1. A circuit breaker having a molded housing, the housing comprising:

a housing reinforcing means; and a first portion and a second portion, wherein the first and second portions each comprise a first side wall and a second side wall, wall, each side wall having a surface at which the portions are joined, each surface including an elongated groove for accepting the housing reinforcing means, the housing reinforcing means being adapted to rest within the elongated grooves;

the housing reinforcing means comprising:

a first member adapted to rest within the elongated grooves of the first side wall; and a second member adapted to rest within the elongated grooves of the second side wall, wherein the first and second members have a substantially dovetail cross-section.

2. A circuit breaker having a molded housing, the housing comprising:

a housing reinforcing means; and a first portion and a second portion, wherein the first and second portions each comprise, at least one side wall having a surface at which the portions are joined, each surface including a first elongated groove wherein the housing reinforcing means comprises a barrier including a first end opposite a second end, wherein the first end includes a first member adapted to rest within the first elongated grooves.

3. The circuit breaker of claim 2, wherein the first and second members have a substantially dovetail cross-section.

4. A circuit breaker housing comprising:

a housing reinforcing means; and a first portion and a second portion, wherein the portions each comprise, a surface at which the portions are joined, the surfaces each including a first elongated groove and a second elongated groove adapted to accept the housing reinforcing means, the housing reinforcing means being adapted to rest within the first and second elongated grooves;

the housing reinforcing means comprising:

a first member adapted to rest within the first elongated grooves; and a second member adapted to rest within the second elongated grooves, wherein the first and second members have a substantially dovetail cross-section.

5. A circuit breaker housing comprising:

a housing reinforcing means; and a first portion and a second portion, wherein the portions each comprise, a surface at which the portions are joined, the surfaces each including a first elongated groove and a second elongated groove adapted to accept the housing reinforcing means, the housing reinforcing means being adapted to rest within the first and second elongated grooves, wherein the housing reinforcing means comprises:

a barrier including a first end opposite a second end, wherein the first end includes a first member adapted to rest within the first elongated grooves and the second end includes a second member adapted to rest within the second elongated grooves.

6. The circuit breaker of claim 5, wherein the first and second members have a substantially dovetail cross-section.

* * * * *